(12) United States Patent
Shibuno

(10) Patent No.: US 8,830,353 B2
(45) Date of Patent: Sep. 9, 2014

(54) CAMERA BODY, AND CAMERA SYSTEM

(75) Inventor: Koji Shibuno, Osaka (JP)

(73) Assignee: Panasonic Corporation, Osaka (JP)

( * ) Notice: Subject to any disclaimer, the term of this patent is extended or adjusted under 35 U.S.C. 154(b) by 273 days.

(21) Appl. No.: 13/277,641

(22) Filed: Oct. 20, 2011

(65) Prior Publication Data

US 2012/0099830 A1 Apr. 26, 2012

(30) Foreign Application Priority Data

Oct. 22, 2010 (JP) ................. 2010-236999

(51) Int. Cl.
| | |
|---|---|
| H04N 5/76 | (2006.01) |
| H04N 5/907 | (2006.01) |
| H04N 5/77 | (2006.01) |
| H04N 5/232 | (2006.01) |
| H04N 9/82 | (2006.01) |
| H04N 9/804 | (2006.01) |

(52) U.S. Cl.
CPC ............ *H04N 5/772* (2013.01); *H04N 5/907* (2013.01); *H04N 9/8042* (2013.01); *H04N 5/23209* (2013.01); *H04N 9/8211* (2013.01)
USPC ..................................................... 348/231.4

(58) Field of Classification Search
USPC ..................................................... 348/231.4
See application file for complete search history.

(56) References Cited

U.S. PATENT DOCUMENTS

| | | | | |
|---|---|---|---|---|
| 2004/0032509 | A1* | 2/2004 | Owens et al. | 348/222.1 |
| 2009/0034746 | A1* | 2/2009 | Nozaki | 381/71.1 |
| 2009/0268082 | A1* | 10/2009 | Shibuno et al. | 348/360 |
| 2009/0284612 | A1* | 11/2009 | Abe et al. | 348/221.1 |

FOREIGN PATENT DOCUMENTS

| | | |
|---|---|---|
| JP | 2005-228400 | 8/2005 |
| JP | 2006-186819 | 7/2006 |
| JP | 2009-260603 | 11/2009 |
| JP | 2010-028281 | 2/2010 |

* cited by examiner

*Primary Examiner* — Sinh Tran
*Assistant Examiner* — Mark Monk
(74) *Attorney, Agent, or Firm* — Panasonic Patent Center

(57) ABSTRACT

An interchangeable lens mountable to a camera body, includes a driving object to be driven, an operating unit that receives an operation performed by a user to provide an instruction for driving the driving object, a driver that drives the driving object, and a lens controller that controls the driver. The lens controller notifies the camera body of information about drive of the driving object corresponding to the operation received by the operating unit, and thereafter, controls the driver to drive the driving object when obtaining information indicating permission for driving the driving object from the camera body.

5 Claims, 8 Drawing Sheets

CAMERA BODY, AND CAMERA SYSTEM

BACKGROUND

1. Technical Field

The technical field relates to a camera system including a camera body, and an interchangeable lens which is mountable to the camera body and has driving members.

2. Related Art

There is known a digital camera capable of reducing noise such as sound occurring when opening or closing a diaphragm mechanism, sound of driving a motor, and so on. For example, JP 2005-228400 A discloses a digital camera which predicts noise sound generation timing at a timing with respect to the timing at which a microcomputer issues a control instruction to a driver for controlling a mechanical mechanism, and at the predicted timing adds audio data with a phase opposite to that of the driving sound data to the audio data including the driving sound, so that noise of the driving sound of the mechanical mechanism is reduced.

For an interchangeable lens type camera, when an operating member of an interchangeable lens is operated by a user, a controller controls an actuator, and so on, in the interchangeable lens. However, a camera body is independent of the interchangeable lens, and thus the camera body cannot recognize content of the operation performed on the operating member of the interchangeable lens.

With the technique disclosed in JP 2005-228400 A, for an interchangeable lens type camera, a camera body cannot predict a timing to reduce the driving sound noise from audio data being recorded, and thus cannot reduce the driving sound noise.

To perform a reduction of such noise sound in the interchangeable lens type camera, the camera body needs to grasp the driving condition of an object to be driven in the interchangeable lens.

In view of the above-described problem, a camera system is provided, in which a camera body in an interchangeable lens type camera can grasp a driving condition of an object to be driven (e.g., a focus lens, a zoom lens, or diaphragm) in an interchangeable lens before the object to be driven is driven.

SUMMARY

In a first aspect, an interchangeable lens is provided that is mountable to a camera body. The interchangeable lens includes a driving object to be driven, an operating unit that receives an operation performed by a user to provide an instruction for driving the driving object, a driver that drives the driving object, and a lens controller that controls the driver. The lens controller notifies the camera body of information about drive of the driving object corresponding to the operation received by the operating unit. Thereafter, the lens controller controls the driver to drive the driving object when obtaining information indicating permission for driving the driving object from the camera body.

In a second aspect, a camera body to which an interchangeable lens is mountable is provided. The interchangeable lens has a driving object to be driven and an operating member that receives an operation performed by a user to provide an instruction for driving the driving object. The camera body includes an imaging unit that captures a subject image formed through the interchangeable lens to generate image information, an audio obtaining unit that obtains audio information at the same time as when the imaging unit generates the image information, a recording unit that records the image information and the audio information in a recording medium, and a camera controller that controls the audio information to be recorded in the recording unit. The camera controller obtains, from the interchangeable lens, information about drive of the driving object corresponding to the operation performed on the operating member, thereafter controls, based on the information about drive, the audio information to be recorded in the recording unit. Thereafter, the camera controller notifies the interchangeable lens of information indicating permission for driving the driving object.

According to the above aspect, when an operation is made for the driving object in the interchangeable lens, the interchangeable lens notifies the camera body of information about drive of the drive object. After receiving the permission for driving the driving object from the camera body, the interchangeable lens starts the driving of the driving object. On the other hand, when the camera body receives the information about drive from the interchangeable lens, the camera body performs a predetermined process in relation to the drive and thereafter notifies the interchangeable lens of the permission for driving the driving object. By such control, the camera body can recognize the driving manner before the interchangeable lens starts drive of the drive object. This enables the camera body to perform a required process in relation to the drive (e.g., a noise cancellation process) before the driving object is driven.

DETAILED DESCRIPTION OF PREFERRED EMBODIMENTS

Embodiments will be described below with reference to the accompanying drawings.

First Embodiment

The configuration and operation of a first embodiment will be described below using the drawings.

1. Configuration

A configuration of a digital camera will be described using FIG. 1.

1-1. Overview

Figure 1:
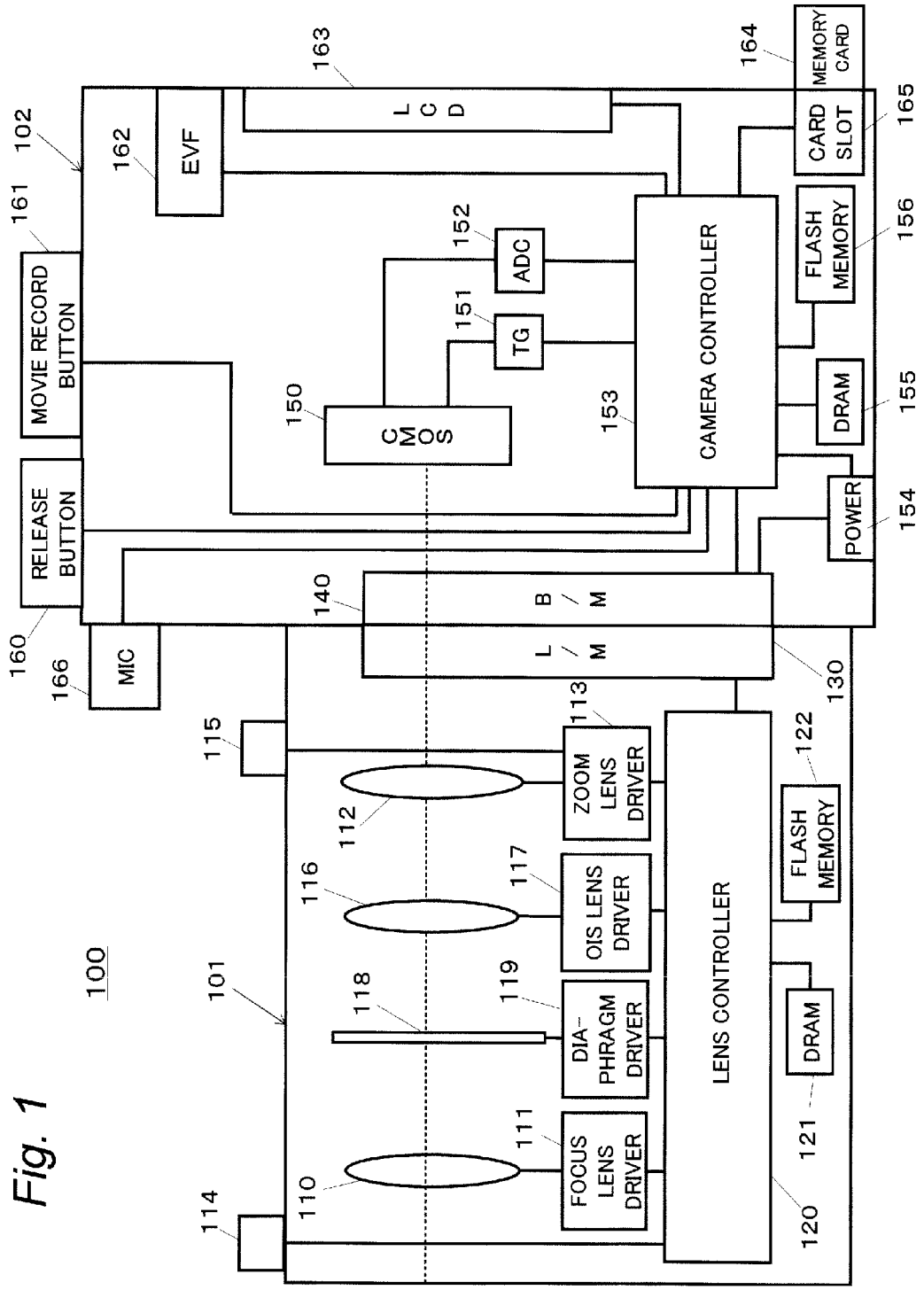
FIG. 1 is a configuration diagram of a digital camera according to an embodiment.

FIG. 1 is a block diagram showing a configuration of a digital camera 100 according to the first embodiment. The digital camera 100 includes a camera body 102 and an interchangeable lens 101 detachable from the camera body 102. The configurations of the camera body 102 and the interchangeable lens 101 will be described below.

1-2. Configuration of Camera Body

The camera body 102 includes a CMOS image sensor 150, a liquid crystal monitor 163, an electronic viewfinder 162 (EVF), a camera controller 153, a body mount 140, a release button 160, a movie record button 161, a power supply 154, a card slot 165, and a microphone 166.

The camera controller 153 controls the overall operation of the digital camera 100 by controlling the CMOS image sensor 150, etc., according to instructions from operating members such as the release button 160 and the movie record button 161. The camera controller 153 sends a vertical synchronizing signal to a timing generator 151 (TG). In parallel with this, the camera controller 153 generates an exposure synchronizing signal, based on the vertical synchronizing signal. The camera controller 153 periodically and repeatedly sends the generated exposure synchronizing signal to a lens controller 120 through the body mount 140 and a lens mount 130. The camera controller 153 uses a DRAM 155 as a working memory when performing a control operation and an image processing operation. The camera controller 153 may include a hard-wired electronic circuit or may include a microcomputer using a program, etc. Alternatively, the camera controller 153 may include the same semiconductor chip on which an image processor and the working memory are formed, or may be a separate unit.

The CMOS image sensor 150 captures a subject image incident thereon through the interchangeable lens 101 and thereby generates image information. The generated image information is converted from data in analog form to data in digital form by an AD converter 152. The image information digitized by the AD converter 152 is subjected to various types of image processing by the camera controller 153. The various types of image processing as used here include, for example, a gamma correction process, a white balance correction process, a flaw correction process, a YC conversion process, an electronic zoom process, and a JPEG compression process, but are not limited thereto. In addition, instead of the CMOS image sensor 150, other imaging devices, e.g., an NMOS image sensor and a CCD image sensor, may be used.

The CMOS image sensor 150 operates at the timing which is controlled by the timing generator 151 (TG). The operations of the CMOS image sensor 150 controlled by the timing generator 151 include a still image capturing operation, a through image capturing operation, a data transfer operation, an electronic shutter operation, etc. A through image is mainly a moving image and is displayed on the liquid crystal monitor 163 or the electronic viewfinder 162 (EVF) in order to determine a composition for capturing a still image.

The liquid crystal monitor 163 is disposed at the rear of the camera body 102 and displays thereon an image represented by display image information processed by the camera controller 153. The liquid crystal monitor 163 can selectively display thereon both a moving image and a still image. In addition to the images, the liquid crystal monitor 163 can display thereon all setting conditions of the digital camera 100, etc. Although, in the present embodiment, the liquid crystal monitor 163 is shown as an example of a display unit, the display unit is not limited thereto. For example, a display unit such as an organic EL display may be used.

The electronic viewfinder 162 (EVF) is disposed at an upper portion of the rear of the camera body 102 and displays thereon an image represented by display image information processed by the camera controller 153, as does the liquid crystal monitor 163.

Display on the liquid crystal monitor 163 and display on the electronic viewfinder (EVF) 162 may be simultaneously performed or display may be performed on either one of them in a switching manner. In the case of simultaneous display, an image displayed on the liquid crystal monitor 163 and an image displayed on the electronic viewfinder 162 may be the same or different.

The body mount 140 is mechanically and electrically connectable to the lens mount 130 of the interchangeable lens 101. The body mount 140 can perform sending and receiving of data between the camera body 102 and the interchangeable lens 101 through the lens mount 130. The body mount 140 sends an exposure synchronizing signal and other control signals which are received from the camera controller 153, to the lens controller 120 through the lens mount 130. In addition, the body mount 140 sends a signal received from the lens controller 120 through the lens mount 130, to the camera controller 153.

The power supply 154 supplies power for driving the digital camera 100. The power supply 154 may be, for example, a dry battery or a rechargeable battery. Alternatively, the power supply 154 may supply power provided from an external source through a power cord, to the digital camera 100. When the power supply 154 is turned on, the camera controller 153 supplies power to the entire camera body 102. In addition, the camera controller 153 supplies power to the interchangeable lens 101 through the body mount 140 and the lens mount 130. Then, the lens controller 120 which will be described later supplies power to the entire interchangeable lens 101.

A flash memory 156 functions as an internal memory for storing image information, etc. In addition, the flash memory 156 saves a program and parameters used when the camera controller 153 performs control.

The card slot 165 enables a memory card 164 to be inserted thereinto and removed therefrom. The card slot 165 can allow the memory card 164 to be electrically and mechanically connected thereto. In addition, the card slot 165 may have the function of controlling the memory card 164.

The memory card 164 is an external memory including therein a storage unit such as a flash memory. The memory card 164 can store data such as image information processed by the camera controller 153. In addition, the memory card 164 can output data such as image information stored therein. The image information outputted from the memory card 164 is processed by the camera controller 153 and is played back and displayed on, for example, the liquid crystal monitor 163, etc. Although, in the present embodiment the memory card 164 is shown as an example of the external memory, the external memory is not limited thereto. For example, a storage medium such as an optical disc may be used as an external memory.

The microphone 166 can collect sounds being generated and can thereby generate audio information. Sounds collected by the microphone 166 include voice produced by a person who is a subject, shooting environmental sound, and the drive sound of a focus lens, etc. The camera controller 153 performs an amplification process on audio information collected by the microphone 166, and thereafter, converts the audio information to digital information. Then, the camera controller 153 can record the audio information converted to the digital information in the memory card 164. For example, the camera controller 153 can record audio information collected and generated upon moving image recording, in the memory card 164 in association with image information subjected to moving image recording. In addition, the camera controller 153 can record audio information collected and generated at arbitrary timing, in the memory card 164 as a voice memo.

The release button 160 accepts a user's operation. The release button 160 is configured to be operated at two steps: a half press and a full press. By the user performing a half-press operation on the release button 160, the camera controller 153 performs an autofocus operation. In addition, by the user performing a full-press operation on the release button 160, the camera controller 153 stores image information generated according to the timing of the full-press operation, in the memory card 164.

The movie record button 161 accepts a user's operation. The user presses the movie record button 161 at any timing while viewing a through image displayed on the liquid crystal monitor 163. When the movie record button 161 is pressed, the camera controller 153 starts recording of moving image information in the memory card 164 from the pressing timing. At the same time, the camera controller 153 starts recording of generated audio information in the memory card 164. During moving image shooting, the camera controller 153 continuously performs an autofocus operation. When the movie record button 161 is pressed again during the moving image shooting, the camera controller 153 terminates storing of the moving image information in the memory card 164.

1-3. Configuration of Interchangeable Lens

The interchangeable lens 101 includes an optical system, a diaphragm 118, the lens controller 120, and the lens mount 130. The optical system of the interchangeable lens 101 includes a focus lens 110, an OIS lens 116, and a zoom lens 112. In addition, the interchangeable lens 101 includes a focus ring 114 and a zoom switch 115.

The lens controller 120 controls the entire interchangeable lens 101. The lens controller 120 may include a hard-wired electronic circuit or may include a microcomputer using a program, etc.

A DRAM 121 is used as a working memory when the lens controller 120 performs control. A flash memory 122 stores a program, parameters, lens data, lens-specific drive data, etc., which are used when the lens controller 120 performs control. The lens data and the lens-specific drive data will be described later. The lens controller 120 notifies the camera controller 153 of various information such as lens data and lens-specific drive data stored in the flash memory 122, upon initial setting or upon shooting. The camera controller 153 can generate a control signal based on the notified various information owned by the interchangeable lens 101, and notify the lens controller 120 of the control signal.

The zoom lens 112 is a lens for changing the magnification of a subject image formed by the optical system of the interchangeable lens 101. The lenses included in the zoom lens 112 may be any in number and of any group. A zoom lens driver 113 drives the zoom lens 112 to move back and forth along an optical axis of the optical system based on control by the lens controller 120. The zoom switch 115 is provided on the exterior of the interchangeable lens 101. When a shooter operates the zoom switch 115, the lens controller 120 generates a control signal according to the operation position and operation speed of the zoom switch 115, and notifies the zoom lens driver 113 of the control signal. This allows the zoom lens driver 113 to drive the zoom lens 112. Namely, when the shooter operates the zoom switch 115, the zoom lens 112 can be motor-driven. Since the interchangeable lens 101 can operate the zoom lens 112 in a motor-driven fashion, even when, for example, moving image recording is performed, the shooter can adjust the angle of view smoothly. In addition, by the lens controller 120 obtaining the position of the zoom lens 112, the lens controller 120 can recognize the zoom magnification in the optical system. The zoom magnification grasped by the lens controller 120 is sent to the camera controller 153 through the lens mount 130. Note that the zoom lens driver 113 can be implemented by, for example, a stepping motor, a DC motor, an ultrasonic motor, etc.

The focus lens 110 is a lens for changing the focus state of a subject image which is incident from the optical system and formed on the CMOS image sensor 150. The lenses included in the focus lens 110 may be any in number and of any group. A focus lens driver 111 drives the focus lens 110 to move back and forth along the optical axis of the optical system, based on control by the lens controller 120. The focus ring 114 is provided on the exterior of the interchangeable lens 101. When the shooter operates the focus ring 114, the lens controller 120 generates a control signal according to the operation position and operation speed of the focus ring 114, and notifies the focus lens driver 111 of the control signal. This allows the focus lens driver 111 to drive the focus lens 110. Note that the focus lens driver 111 can be implemented by, for example, a stepping motor, a DC motor, an ultrasonic motor, etc.

The OIS lens 116 is a lens for correcting a blur of a subject image formed by the optical system of the interchangeable lens 101. The OIS lens 116 moves in a direction in which a camera shake of the digital camera 100 is compensated for, and thereby reduces a blur of a subject image on the CMOS image sensor 150. The OIS lens 116 includes one or a plurality of lenses. An OIS lens driver 117 drives the OIS lens 116 in a plane perpendicular to the optical axis of the optical system in response to control from the lens controller 120. The OIS lens driver 117 can be implemented by, for example, a magnet and a planar coil. The interchangeable lens 101 further includes, though not shown, an OIS lens position detection sensor which is a sensor that senses the position of the OIS lens 116 in the plane perpendicular to the optical axis of the optical system. The OIS lens position detection sensor can be implemented by, for example, a magnet and a Hall element. The lens controller 120 controls the OIS lens driver 117 based on the result of sensing by the OIS lens position detection sensor and the result of sensing by a camera shake sensor such as a gyro sensor.

The diaphragm 118 is a member for regulating the amount of light passing through the optical system. For example, light can be regulated by increasing or reducing the size of an opening formed by five blades, etc. The diaphragm 118 is driven by an diaphragm driver 119. The diaphragm driver 119 is provided to change the size of the opening of the diaphragm 118. The diaphragm driver 119 includes a motor, a driver, etc. In the first embodiment, the size of the opening of the diaphragm 118 is changed based on a control signal from the lens controller 120.

1-4. Correspondences of Terms

The zoom switch 115 is an example of an operating unit. The zoom lens 112 is an example of a driving object (object to be driven). The zoom lens driver 113 is an example of a driver. The lens controller 120 is an example of a lens controller. The interchangeable lens 101 is an example of an interchangeable lens.

The CMOS image sensor 150 is an example of an imaging unit. The microphone 166 is an example of an audio obtaining unit. The memory card 164 is an example of a recording medium. The camera controller 153 is an example of a recording unit. The camera controller 153 is an example of a camera controller. The camera body 102 is an example of a camera body. The digital camera 100 is an example of a camera system.

2. Operation

The operation of the digital camera 100 will be described below using the drawings.

2-1. Image Capturing Preparation Operation

Figure 2:
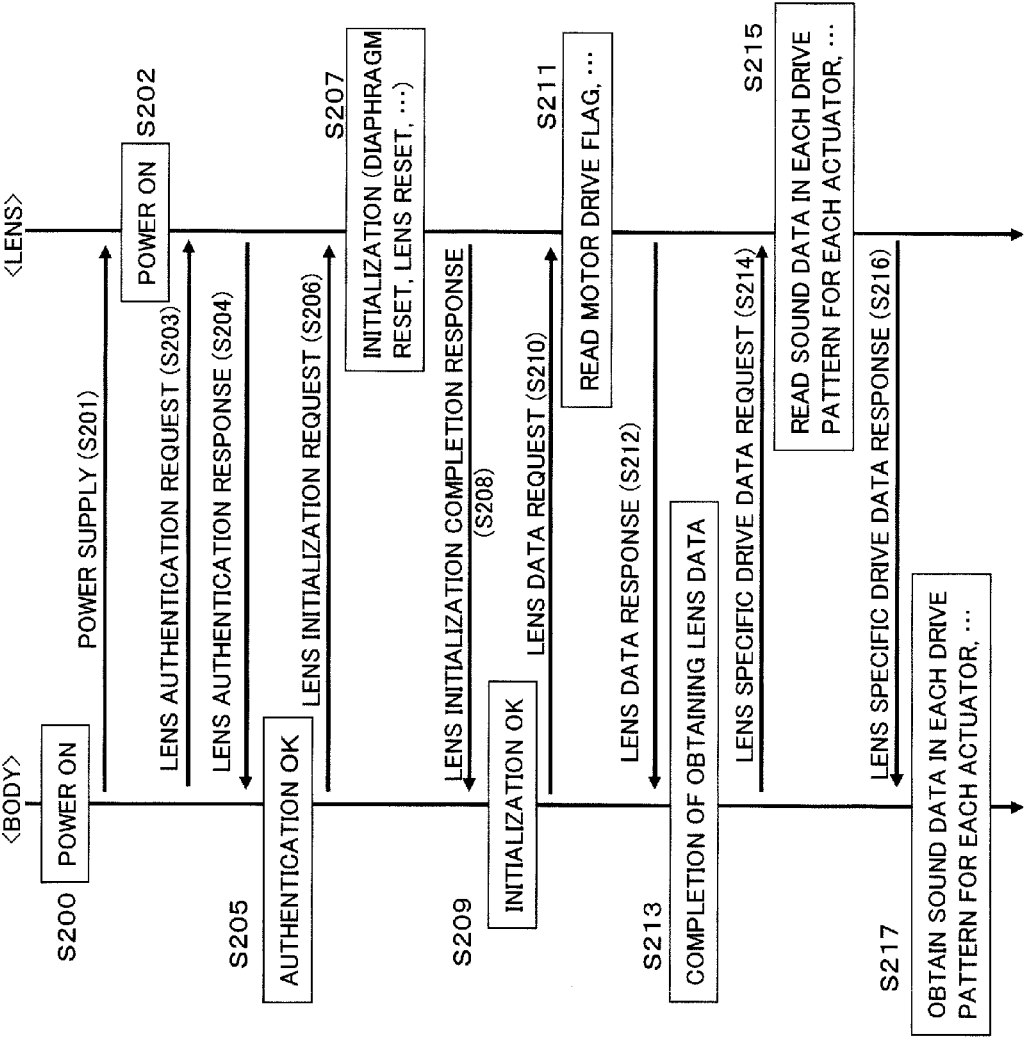
FIG. 2 is a diagram describing the operation of the digital camera for image capturing preparation.

The operation of the digital camera 100 for preparation for capturing images will be described. FIG. 2 is a diagram describing an initial setting operation for the image capturing preparation which is to be performed when the power to the digital camera 100 is turned on.

When the user turns on the power supply 154 to the camera body 102 with the interchangeable lens 101 attached to the camera body 102 (S200), the power supply 154 supplies power to the interchangeable lens 101 through the body mount 140 and the lens mount 130 (S201). By this, power is supplied to each of units included in the interchangeable lens 101 (S202). Then, the camera controller 153 requests the lens controller 120 for authentication information of the interchangeable lens 101 (S203). Here, the authentication information of the interchangeable lens 101 includes information as to whether the interchangeable lens 101 is attached and information as to whether accessories are attached. The lens controller 120 responds to the lens authentication request from the camera controller 153 (S204). By this, the camera controller 153 completes the lens authentication and can recognize whether the interchangeable lens 101 is attached to the camera body 102 and whether accessories such as a teleconverter lens and a wide converter lens are attached (S205).

Then, the camera controller 153 requests the lens controller 120 to perform an initialization operation (S206). In response to this, the lens controller 120 performs an initialization operation such as resetting the diaphragm 118 and resetting the OIS lens 116 (S207). Then, the lens controller 120 sends the camera controller 153 a response indicating that the lens initialization operation has been completed (S208). This enables the camera controller 153 to recognize that the lens has been initialized (S209).

Then, the camera controller 153 requests the lens controller 120 for lens data (S210). The lens data is stored in the flash memory 122 of the interchangeable lens 101. Hence, the lens controller 120 reads lens data from the flash memory 122 (S211) and sends, as a response, the lens data to the camera controller 153 (S212). Here, the lens data includes information indicating characteristics specific to the interchangeable lens 101 such as, for example, lens name, F-number, focal length, and information as to whether it has a motor-driven zoom function. In this manner, the camera controller 153 completes obtaining of the lens data of the attached interchangeable lens 101 (S213).

Subsequently, the camera controller 153 requests the lens controller 120 for lens-specific drive data (S214). The lens-specific drive data is stored in the flash memory 122 of the interchangeable lens 101. Hence, the lens controller 120 reads lens-specific drive data from the flash memory 122 (S215) and sends, as a response, the lens-specific drive data to the camera controller 153 (S216). The lens-specific drive data includes sound data for each of drive patterns for the respective actuators (a detail of which will be described later), zoom switch type information, zoom speed upper and lower limit information, etc. In this manner, the camera controller 153 obtains the lens-specific drive data including sound data for each drive pattern for each actuator, etc. (S217).

2-2. Sound Data for Actuator

Figure 3:
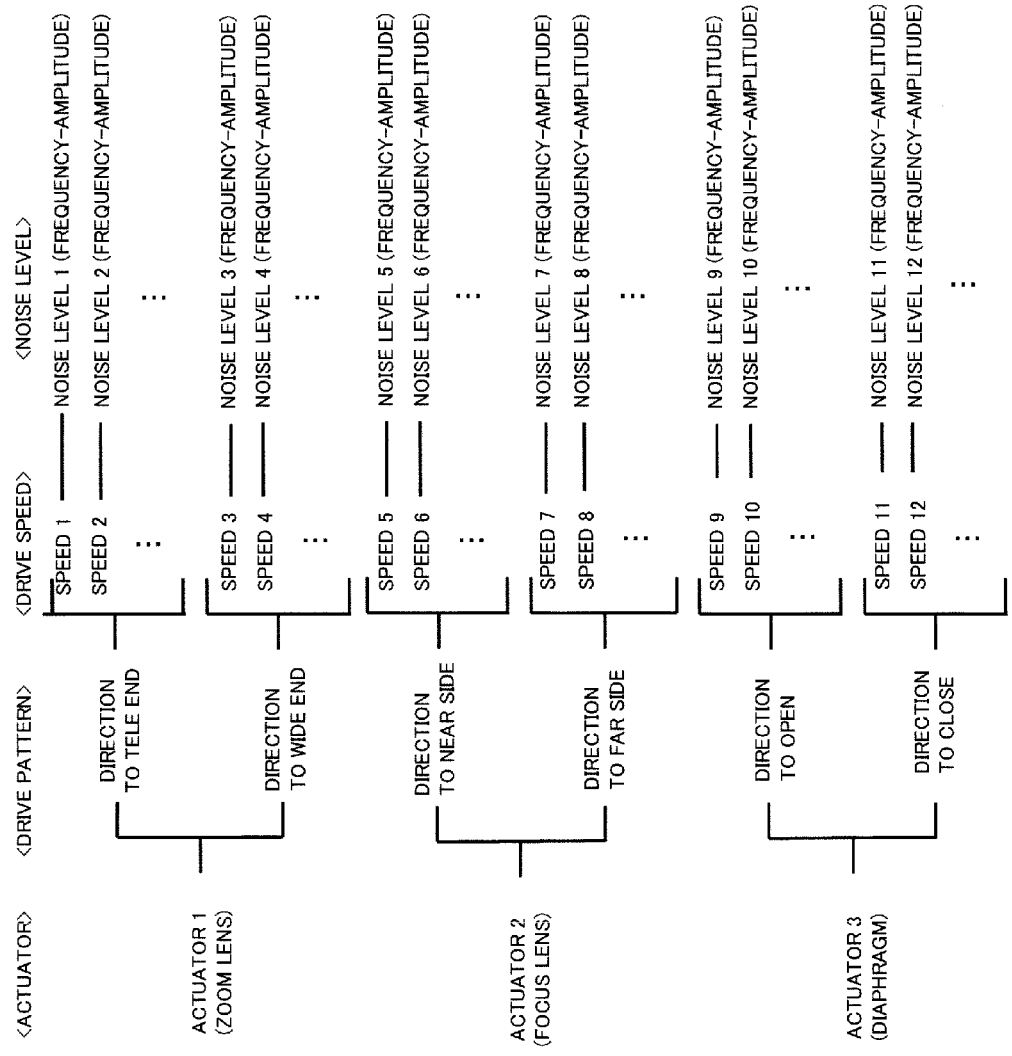
FIG. 3 is a diagram describing sound data for each drive pattern for each actuator.

FIG. 3 is a diagram describing sound data for each drive pattern for each actuator. As shown in FIG. 3, sound data is data which associates drive speed and noise level with drive pattern of each of the actuators for driving objects (objects to be driven) such as the zoom lens 112, the focus lens 110, and the diaphragm 118.

Specifically, regarding sound data for the zoom lens driver 113 for driving the zoom lens 112, the zoom lens driver 113 is defined as an "actuator 1", a tele end direction or a wide end direction is defined as a drive pattern, and drive speed and noise level are associated with each other for each drive pattern. Regarding sound data for the focus lens driver 111 for driving the focus lens 110, the focus lens driver 111 is defined as an "actuator 2", a Near side direction or a Far side direction is defined as a drive pattern, and drive speed and noise level are associated with each other for each drive pattern. Likewise, regarding sound data for the diaphragm driver 119 that drives the diaphragm 118, the diaphragm driver 119 is defined as an "actuator 3", an open direction or a close direction is defined as a drive pattern, and drive speed and noise level are associated with each other for each drive pattern. It is noted that the noise level is represented by the frequency and amplitude level of a noise which is expected to be possibly generated when an actuator is driven in a given drive pattern and at a given drive speed. For example, the noise level with the zoom lens 112 driven in the tele end direction and at drive speed 1 is noise level 1.

The camera controller 153 can recognize noise expected to be generated when each actuator is driven in each drive pattern and at each drive speed by referring to the sound data obtained from the interchangeable lens 101 in the initial setting operation. Therefore, even if the camera controller 153 provides a drive control instruction for a given actuator to the lens controller 120, the camera controller 153 can perform control to cancel out noise which is expected to be generated by the drive of the actuator. For example, noise cancellation control can be performed using, for example, a technique of subtracting opposite-phase data of noise which is expected to be generated by the drive of an actuator, from audio data collected by the microphone 166 and processed.

Type information of the zoom switch is information about content of the drive control of the zoom lens 112, which is defined by the operation position and operation speed of the zoom switch 115. Although, in the present embodiment, the zoom switch 115 is shown as an example of a zoom operation unit, the zoom switch 115 may be in a ring form or in a lever form. The zoom speed upper and lower limit information is information on the upper and lower limits of zoom speed when the zoom lens 112 is driven by the zoom lens driver 113.

As described above, the camera body 102 and the interchangeable lens 101 requests for required data and responses thereto, and then the camera body 102 and the interchangeable lens 101 complete the initial setting operation.

2-3. Moving Image Recording Operation

Figure 4:
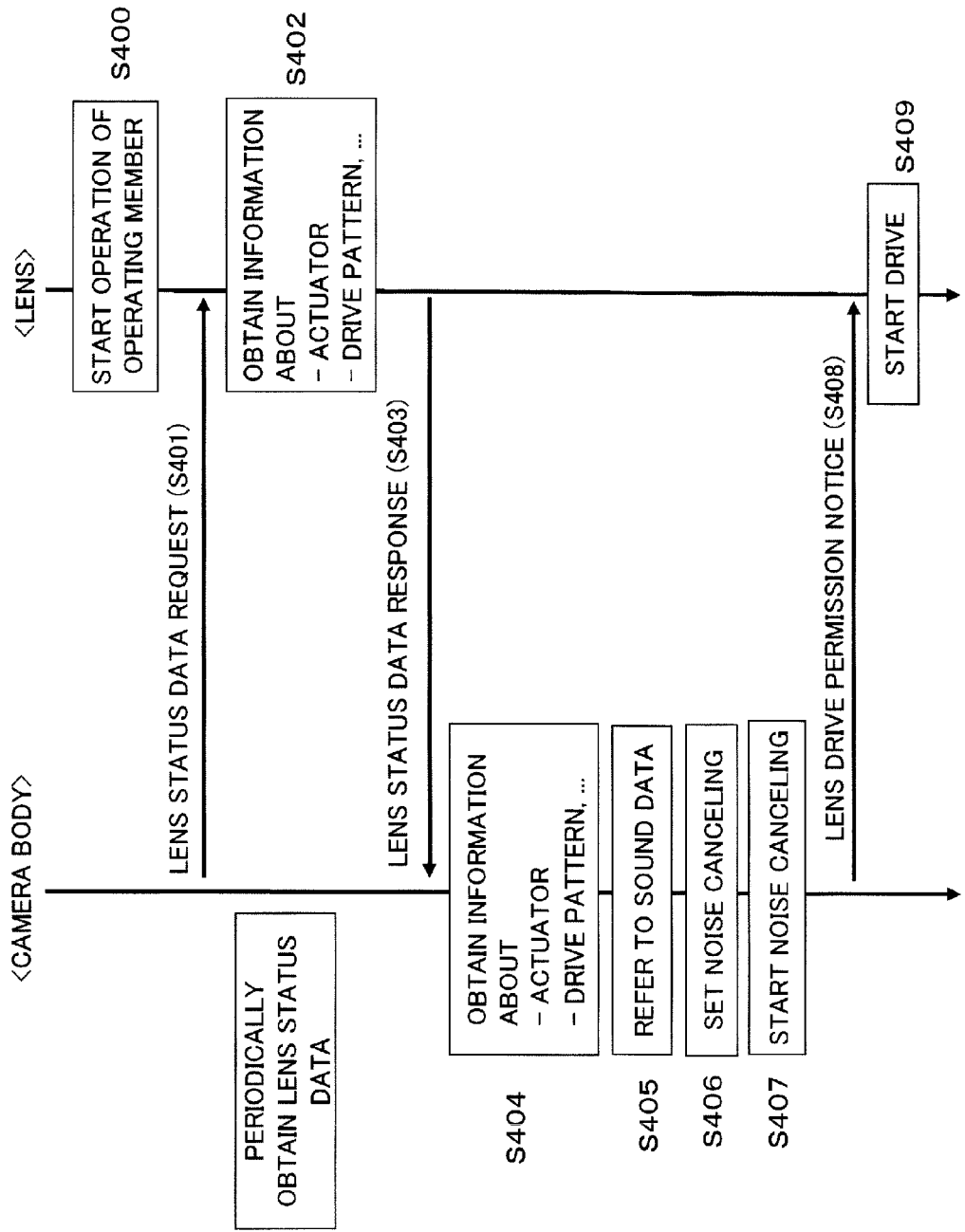
FIG. 4 is a diagram describing a moving image recording operation (for first round control) which is performed at the start of an operation of an operating member.
Figure 5:
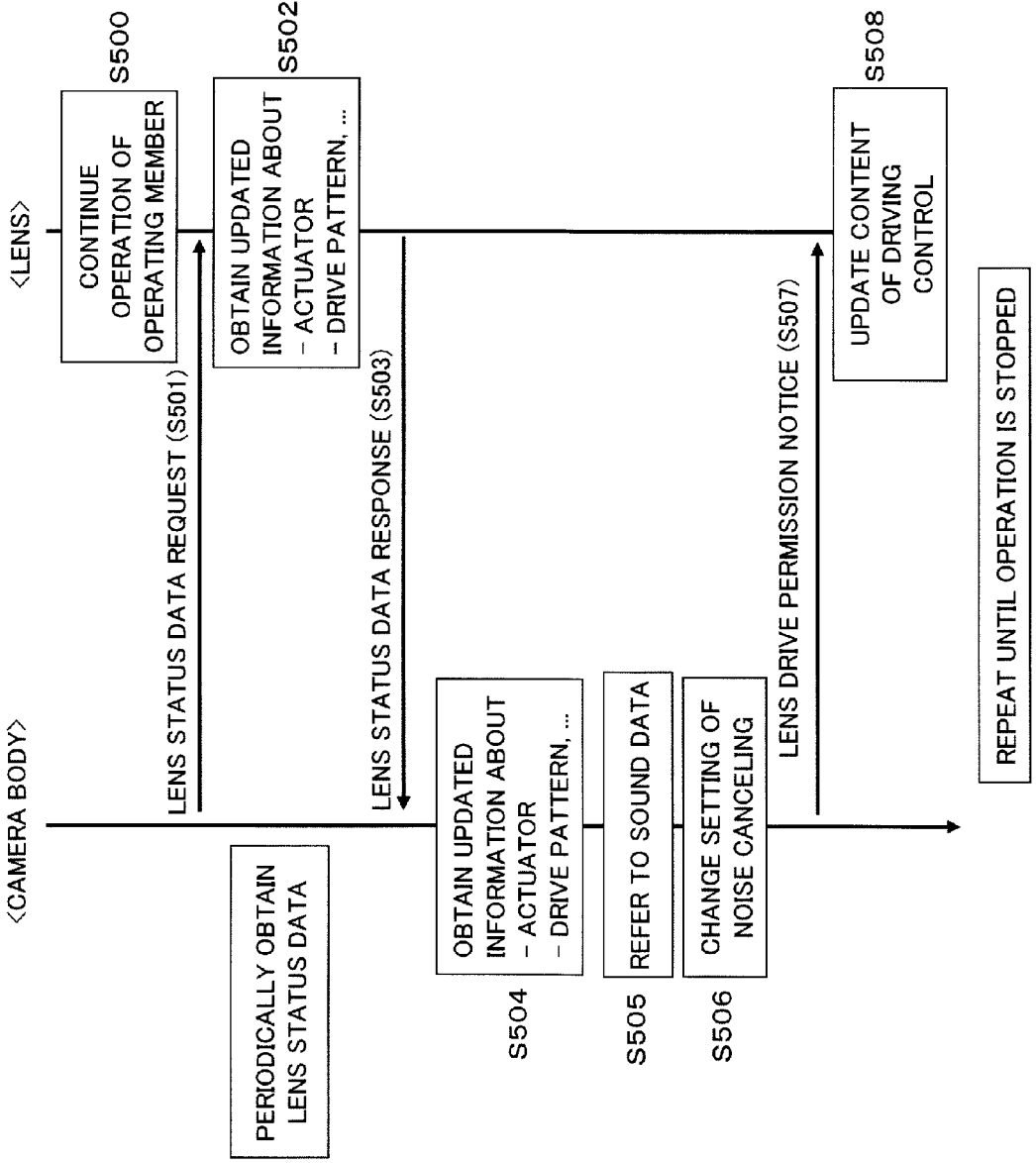
FIG. 5 is a diagram describing a moving image recording operation (for second or subsequent round control) which is performed when the operation of the operating member is maintained.
Figure 6:
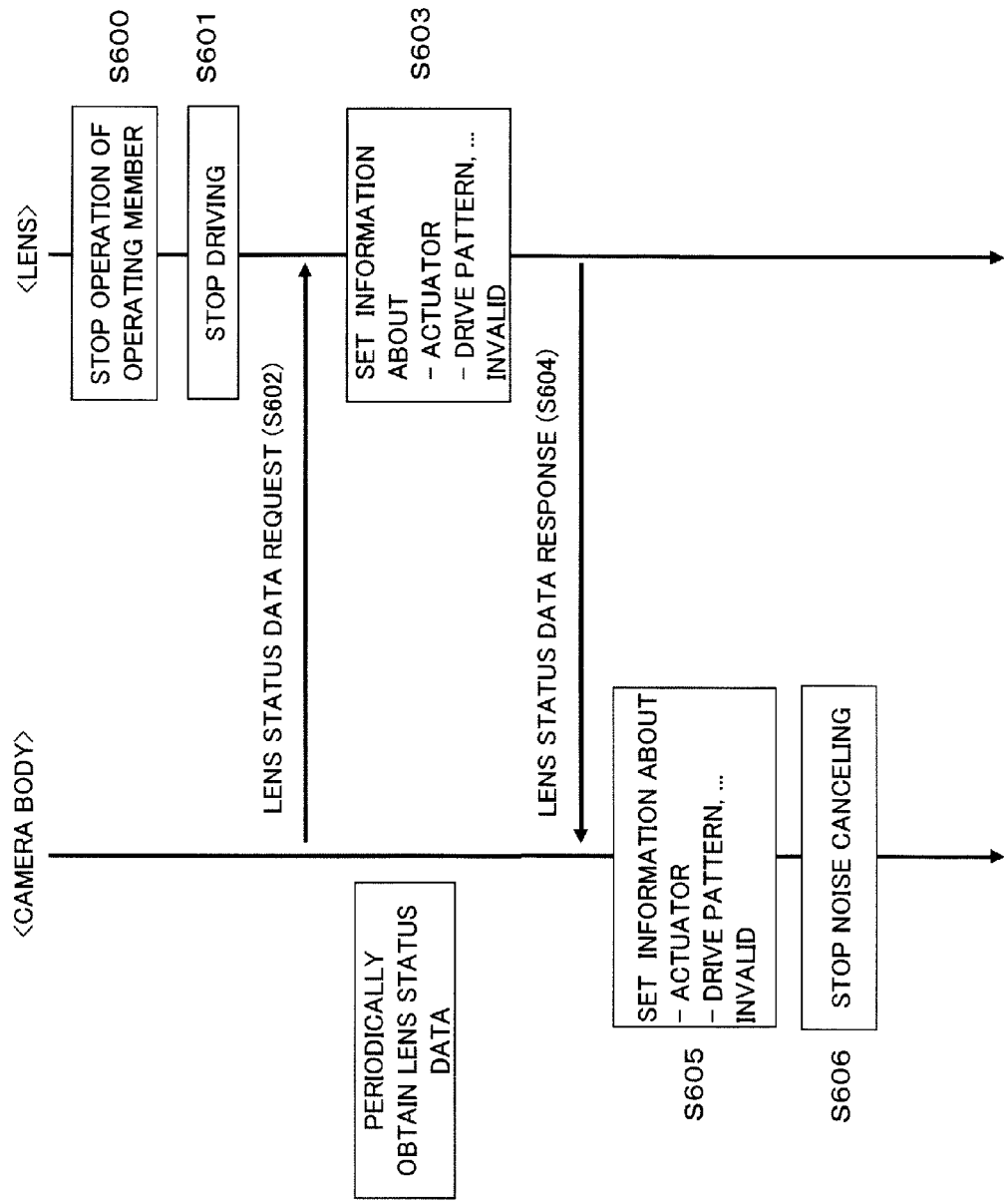
FIG. 6 is a diagram describing an operation performed when the operation of the operating member is cancelled or stopped.

A moving image recording operation of the digital camera 100 will be described using FIGS. 4 to 6. FIG. 4 is a diagram showing a sequence of a moving image recording operation in the first control cycle, which is performed when an operation (manipulation) of the operating member such as the zoom switch 115 starts. FIG. 5 is a diagram showing a sequence of a moving image recording operation in the second or subsequent control cycle, which is performed when, the operation is maintained after starting the operation of the operating member. FIG. 6 is a diagram showing a sequence of a moving image recording operation performed when an operation of the operating member is cancelled or stopped in the second or subsequent control cycle after starting the operation. Note that the operations described below are performed when the camera controller 153 determines, based on lens data obtained from the interchangeable lens 101, that the interchangeable lens 101 has a motor-driven zoom function.

When the camera controller 153 obtains lens data of the interchangeable lens 102 attached to the camera body 102, the digital camera 100 goes into a state in which the digital camera 100 can capture an image. In this state, the release button 160 and the movie record button 161 are waiting for an operation performed by a user. At this time, if the release button 160 is operated by the user, then still image recording is performed, while if the movie record button 161 is operated, then moving image recording starts. At this time, the camera controller 153 notifies the lens controller 120 that moving image recording has started. An operation performed after starting a moving image recording operation will be described below. In a moving image recording, recording of a moving image captured by the CMOS image sensor 150 and recording of audio information collected and generated by the microphone 166 are performed.

2-3-1. Operation in First Control Cycle

With reference to FIG. 4, a moving image recording operation in the first control cycle which is performed when an operation of the operating member such as the zoom switch 115 starts, will be described. In the state in which an image can be captured, each operating member is in a state of waiting for an operation performed by a user. When the operating member is operated by the user, a drive instruction from the operating member to the lens controller 120 starts (S400). For example, in the state in which an image can be captured, the zoom switch 115 is in a state of waiting for an operation performed by the user. When the zoom switch 115 is operated by the user, the zoom instruction from the zoom switch 115 to the lens controller 120 starts (S400). Likewise, other operating members such as the focus ring 114 are also in a state of waiting for an operation performed by the user, and drive instruction is started according to the operation performed by the user (S400). The following describes the case in which, after starting moving image recording, an operation of an operating member such as the zoom switch 115 or the focus ring 114 starts.

In the state in which an image can be captured, the camera controller 153 periodically requests the lens controller 120 for lens status data representing the state of the interchangeable lens 101 (S401). The lens status data includes, for example, the zoom magnification information of the zoom lens 112, the position information of the focus lens 110, and aperture value information. In addition, the lens status data includes information about an actuator, information about a drive pattern, and drive speed information.

When an operation of the zoom switch 115 starts, the lens controller 120 determines, according to the operation position and operation speed of the zoom switch 115, whether to drive the zoom lens 112 in the tele end direction or the wide end direction, and what drive speed the zoom lens 112 is driven. When the focus ring 114 is operated, the lens controller 120 determines, according to the operation position and operation speed of the focus ring 114, whether to drive the focus lens 110 in the Far side direction or the Near side direction with respect to a subject, and what drive speed the focus lens 110 is driven. When an operating member is provided that allows the user to operate opening and closing of the diaphragm 118 in a motor-driven fashion, the lens controller 120 determines, according to the operation position and operation speed of the operating member, a drive speed at which the diaphragm 118 is driven in the open direction and in the close direction, respectively.

In response to the request for lens status data from the camera controller 153, the lens controller 120 obtains information About an actuator, information about a drive pattern, and drive speed information which are determined in the above-described manner according to condition of users operation of an operating member (S402). The lens controller 120 sends, as a response, lens status data including the obtained information about an actuator, information about a drive pattern, and drive speed information, to the camera controller 153 before notifying a driver such as the zoom lens driver 113 or the focus lens driver 111 of a drive control signal (S403). Namely, before controlling the actuator to actually start its drive, the lens controller 120 sends, as a response, lens status data to the camera controller 153.

By the response of the lens status data from the lens controller 120, the camera controller 153 obtains information about an actuator, information about a drive pattern, and drive speed information (S404). Subsequently, the camera controller 153 refers to sound data (see FIG. 3) obtained in the initial setting operation, based on the obtained information about an actuator, information about a drive pattern, and drive speed information (S405).

For example, when the zoom switch 115 is operated in an operation position or at an operation speed so that the direction is the tele end direction and the zoom speed is speed 1, the lens controller 120 notifies the camera controller 153 of information indicating in lens status data that "the zoom lens 112 is driven in the tele end direction and at speed 1", before actually driving the zoom lens 112. At this time, the camera controller 153 can recognize a noise level expected to occur, by referring to the sound data based on the notified information. For example, when "the zoom lens 112 is driven in the tele end direction and at speed 1", it can be recognized that the noise level expected to occur is "noise level 1" (see FIG. 3). This enables the camera body 102 to know in advance a noise level expected to occur due to an operation performed on the interchangeable lens 101.

The camera controller 153 performs noise canceling setting according to the recognized noise level (S406). In the case in which "the zoom lens 112 is driven in the tele end direction and at speed 1", setting is performed to cancel out noise at noise level 1. A noise cancellation process includes, for example, a filter process to cut and suppress an audio signal with a predetermined frequency in the recorded audio signal.

The camera controller 153 then starts the set noise cancellation process (S407). After starting the noise cancellation process, the camera controller 153 sends notification about permission to drive the lens (lens drive permission notice) to the lens controller 120 (S408).

In response to the lens drive permission notice from the camera controller 153, the lens controller 120 starts drive of the actuator for the object operated by the user (S409). When the actuator for the operated member starts its driving, the camera controller 153 has started a noise cancellation process for the drive. Hence, even if noise generated by the drive of the actuator for the operated member is collected by the microphone 166, the noise is cancelled out from the audio information.

As described above, in an interchangeable lens type camera body, when an actuator in the interchangeable lens 101 is driven by an operation performed on the interchangeable lens 101, the interchangeable lens 101 notifies the camera body 102 of information about the drive of the actuator, before actually driving the actuator. This enables the camera body 102 to recognize noise which is expected to occur due to the operation performed on the interchangeable lens 101, before the noise is generated. As a result, when noise generation is expected, the camera controller 153 can securely perform a noise cancellation process.

2-3-2. Operation for Second or Subsequent Control Cycle

FIG. 5 is a diagram showing a sequence of a moving image recording operation for second or subsequent control cycle, which is performed when the operation is continued after starting an operation of the operating member.

Even when an operation of the operating member is continued by the user (S500), the camera controller 153 periodically requests the lens controller 120 for lens status data (S501). At this time, even if the operation of the operating member is continued by the user, when a change occurs in operation position or operation speed, the manner of driving an actuator as an object to be driven is also changed. Namely, when a change occurs in operation position or operation speed, the noise level expected to occur is changed. Hence, in response to the request for lens status data from the camera controller 153, the lens controller 120 obtains information about an actuator, information about a drive pattern, and drive speed information, based on the changed operation position or operation speed (S502). Then, the lens controller 120 sends, as a response, lens status data including the information about an actuator, the information about a drive pattern, and the drive speed information to the camera controller 153 before sending a drive control signal to a driver such as the zoom lens driver 113 or the focus lens driver 111 (S503).

By the response of the lens status data from the lens controller 120, the camera controller 153 obtains information about an actuator, information about a drive pattern, and drive speed information (S504). Subsequently, the camera controller 153 refers to sound data obtained in the initial setting operation, based on the obtained information about an actuator, information about a drive pattern, and drive speed information (S505).

For example, when an operation of the zoom switch 115 (operation position and operation speed) are changed such that the direction is the wide end direction and the zoom speed is speed 3, the lens controller 120 notifies the camera controller 153 of information indicating that "the zoom lens 112 is driven in the wide end direction and at speed 3", before actually driving the zoom lens 112. At this time, the camera controller 153 can recognize that the noise level expected to occur when "the zoom lens 112 is driven in the wide end direction and at speed 3" is "noise level 3", by referring to the sound data (see FIG. 3) based on the notified information. This enables the camera body 102 to know in advance noise expected to be generated by an operation performed on the interchangeable lens 101.

The camera controller 153 changes the noise canceling setting, according to the recognized noise level (S506). For example, when "the zoom lens 112 is driven in the wide end direction and at speed 3", the noise canceling setting is set for canceling out noise at noise level 3. At this time, since the noise cancellation process has been performed since the first control cycle, the timing at which the noise canceling setting is changed to that for noise level 3 is a timing at which a cancellation process for noise level 3 starts.

After changing the noise canceling setting, the camera controller 153 sends lens drive permission notice to the lens controller 120 (S507).

In response to the lens drive permission notice from the camera controller 153, the lens controller 120 updates the content of driving control of the actuator for the operating member operated by the user (S508). When the content of driving control of the actuator for the operated member is updated, the camera controller 153 has started a noise cancellation process for the updated driving control. Hence, even if noise generated by driving the actuator for the operated member is collected by the microphone 166, the noise is cancelled out from the audio information.

The operations in steps S500 to S508 are repeated while the user continues the switch operation.

As described above, in the interchangeable lens type camera body 102, even when the content of driving control of an actuator in the interchangeable lens 101 is changed due to an operation performed on the interchangeable lens 101, the interchangeable lens 101 notifies the camera body 102 of the change before the content of driving control of the actuator is actually changed. This enables the camera body 102 to recognize noise which is expected to occur due to the operation performed on the interchangeable lens 101, before the noise occurs. As a result, when occurrence of noise is expected, the camera controller 153 can securely perform a noise cancellation process.

2-3-3. Operation Performed when Operation of Operating Member is Cancelled

FIG. 6 is a diagram showing a sequence of a moving image recording operation performed when an operation of the operating member such as the zoom switch 115 is cancelled (stopped) in the second or subsequent control cycle after starting the operation.

When the operation of the operating member by the user is canceled (stopped) (S600), the lens controller 120 stops the driving of the actuator for the operated member (S601). Once the actuator is stopped, noise is not generated and thus the camera controller 153 does not need to perform noise cancellation. Therefore, when the operation of the operating member is cancelled, the lens controller 120 stops the driving of the actuator for the operated member without sending, as a response, the lens status data indicating such a fact to the camera controller 153.

During this period, the camera controller 153 periodically requests the lens controller 120 for lens status data (S602). At this time, since the lens controller 120 has stopped the drive of the actuator for the operated member, the lens controller 120 invalidates information about an actuator, information about a drive pattern, and drive speed information (S603) for the actuator. Then, the lens controller 120 sends, as a response, lens status data including information indicating that each piece of information is invalid, to the camera controller 153 (S604).

In response to the response of the lens status data from the lens controller 120, the camera controller 153 invalidates information about an actuator, information about a drive pattern, and drive speed information (S605). Then, the camera controller 153 ends the noise cancellation process (S606).

As described above, when the user cancels an operation of an operating member, the drive of the actuator for the operated operating member is stopped before notifying the camera controller 153 of the stop of the operation of the operating member. This is because, when the actuator is stopped, noise is not generated and thus there is no need to perform noise cancellation. By this, when the lens controller 120 receives stop of the operation of the operating member by the user, the lens controller 120 can immediately stop the actuator without sending a response to the camera controller 153.

2-4. Operation in Standby State

The above explanation is made for exemplary operations performed after the movie record button 161 is operated in a state in which an image can be captured after completion of the initial setting operation. In the following description, an exemplary operation performed in a standby state before the movie record button 161 is operated in the state in which an image can be captured, and an exemplary operation performed when the movie record button 161 is operated again during moving image recording to terminate the moving image recording will be described.

In the operation described below, the camera controller 153 does not record a moving image being captured by the CMOS image sensor 150 and audio information collected and generated by the microphone 166, but the liquid crystal monitor 163 displays a through image based on a moving image being captured. The user can adjust the shooting angle of view by operating the zoom switch 115 while viewing the through image.

Figure 7:
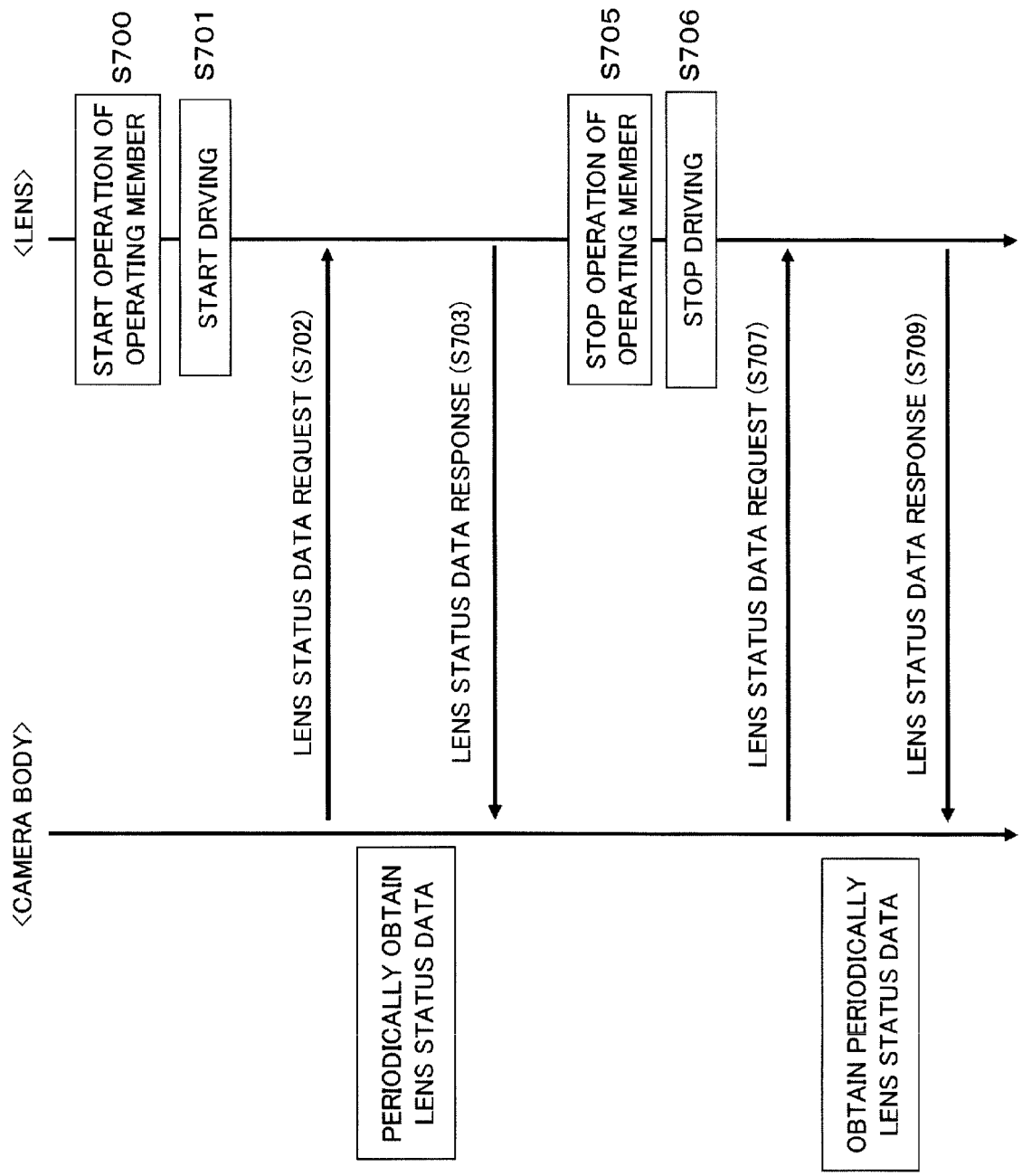
FIG. 7 is a diagram describing an operation performed in a standby state where moving image recording is not performed.

FIG. 7 is a diagram showing a sequence of an operation in a standby state where moving image recording is not performed. When, in a state of waiting for an operation performed by the user, an operation of an operating member by the user starts (S700), the lens controller 120 starts the drive of an actuator for the operated member without sending, as a response, lens status data including information indicating the start of the operation of the operated member, to the camera controller 153 (S701). For example, when an operation of the zoom switch 115 starts in the standby state, the lens controller 120 sends the zoom lens driver 113 a control signal to start drive of the zoom lens 112 without sending, as a response, lens status data including information indicating the start of the operation of the zoom switch 115 to the camera controller 153. This is because, in a standby state of moving image recording, sound is not recorded and thus even if noise is generated by the activation of an actuator for the operated member, there is no need to perform noise cancellation. Namely, in a standby state of moving image recording, when the lens controller 120 receives an operation of the operating member by the user, the lens controller 120 does not send a response to the camera controller 153, and thus, the lens controller 120 can immediately start drive of an actuator for the operated member.

During this period, the camera controller 153 periodically requests the lens controller 120 for lens status data (S702). In response to this request, the lens controller 120 sends lens status data such as zoom magnification information of the zoom lens 112, to the camera controller 153 (S703).

When the operation of the operating member by the user is stopped in a standby state where moving image recording is not performed (S705), the lens controller 120 sends the actuator for the operated member a control signal to stop the drive of the actuator for the operated member without sending, as a response, lens status data including information indicating the stop of the operation of the operating member, to the camera controller 153 (S706). For example, when the operation of the zoom switch 115 is stopped (S705), the lens controller 120 sends the zoom lens driver 113 a control signal to stop the drive of the zoom lens 112 without sending, as a response, lens status data including information indicating the stop of the operation of the zoom switch 115 to the camera controller 153 (S706). This is because, once an actuator is stopped, noise is not generated and moreover sound recording is not performed, and thus there is no need to perform noise cancellation. For this reason, when the lens controller 120 receives stop of the operation of the operating member by the user, the lens controller 120 can immediately stop the actuator without sending a response to the camera controller 153.

In this case, too, the camera controller 153 periodically requests the lens controller 120 for lens status data (S707). In response to this request, the lens controller 120 sends lens status data including zoom magnification information of the zoom lens 112, etc., to the camera controller 153 (S709).

As described above, in a state (a first state) where moving image recording is being performed, the lens controller 120 performs control to notify the camera controller 153 that an operation is performed by the user, before actually driving an actuator to be operated. On the other hand, in a standby state (a second state) where moving image recording is not performed yet, the lens controller 120 performs control not to notify the camera controller 153 that an operation is performed by the user, before actually driving an actuator to be operated. By such control, only when audio recording is performed, the lens controller 120 notifies the camera controller 153 that the operation is performed by the user before starting the drive, thus improving communication efficiency and suppressing power consumption. Note that, since the camera controller 153 notifies the lens controller 120 of the start or stop of moving image recording, the lens controller 120 can determine whether the digital camera 100 is in a moving image recording state as a result of the movie record button 161 being operated, i.e., determine whether the digital camera 100 is in the first state or in the second state.

3. Summary

The interchangeable lens 101 according to the present embodiment is mountable to the camera body 102 and includes a driving object to be driven such as a zoom lens 112, an operating unit such as a zoom switch 115 that receives an operation performed by a user to provide an instruction for driving the driving object, a driver such as a zoom lens driver 113 that drives the driving object such as the zoom lens 112, and a lens controller 120 that controls the driver. The lens controller 120 notifies the camera body 102 of information about drive of the driving object corresponding to the operation received by the operating unit. Thereafter, when obtaining information (lens drive permission notice) indicating permission for driving the driving object from the camera body 102, the lens controller 120 controls the driver to drive the driving object. This enables the interchangeable lens 101 to perform control to start driving the driving object after notifying the camera body 102 of information about drive of the driving object such as the zoom lens 112. In other words, the camera body 102 can obtain information about drive of the driving object before the driver actually begins driving of the driving object. Namely, the camera body 102 can recognize the driving manner of the driving object before the driver such as the zoom lens driver 113 drives the driving object such as the zoom lens 112.

In particular, when obtaining the information indicating permission (lens drive permission notice) from the camera body 102 after notifying the camera body 102 of information about drive of the driving object, the lens controller 120 controls the driver to drive the driving object. By this, the interchangeable lens 101 can wait to perform drive control of the driving object until obtaining the lens drive permission notice from the camera body 102. Therefore, the camera body 102 can take measures to avoid the occurrence of a problem which may be caused by the drive of the driving object and thereafter send the lens drive permission, thus occurrence of a problem which may be caused by the drive of the driving object can be prevented.

The camera body 102 according to the first embodiment is a camera body to which an interchangeable lens 101 is mountable, the interchangeable lens 101 having a driving object to be driven and an operating member that receives an operation performed by a user to provide an instruction for driving the driving object. The camera body 102 includes a CMOS image sensor 150 that captures a subject image formed through the interchangeable lens 101 to generate image information, a microphone 166 that obtains audio information at the same time as when the CMOS image sensor 150 generates the image information, a recording unit (a camera controller 153 and a card slot 165) that records the image information and the audio information in a memory card 164, and the camera controller 153 that controls the audio information to be recorded in the recording unit. The camera controller 153 obtains, from the interchangeable lens 101, information about drive of the driving object corresponding to an operation performed on a zoom switch 115, and thereafter controls, based on the information about drive, the audio information to be recorded in the recording unit. Thereafter, the camera controller 153 notifies the interchangeable lens 101 of information for permission for driving the driving object. By this, the camera body 102 can recognize in advance the driving manner of the mounted interchangeable lens 101 and thus can appropriately control audio information to be recorded.

In particular, the camera controller 153 sends the lens drive permission notice to the interchangeable lens 101 after controlling, based on the information about drive, the audio information recorded in the recording unit (the camera controller 153 and the card slot 165) lens drive permission notice. By this, the camera body 102 can allow the drive of the driving object in the interchangeable lens 101 to start, after performing appropriate control of audio information to be recorded.

4. Other Embodiments

In addition to the above-described first embodiment, other embodiments can be considered. The other embodiments will be summarized below.

Although, in the first embodiment, the camera controller 153 operates to notify the lens controller 120 of the lens drive permission after starting a noise cancellation process, the embodiment is not limited thereto. For example, the camera controller 153 may predict a timing at which a noise cancellation process starts, and notify the lens controller 120 of the lens drive permission before starting the noise cancellation process. Specifically, the lens controller 120 may notify the camera controller 153 of information about drive, such as an actuator, a drive pattern, and drive speed, before actually driving the actuator. The same control may also be performed when the noise cancellation content is updated.

Although the first embodiment describes an example case in which the zoom switch 115 is an object to be operated and the zoom lens 112 is an object to be driven, the embodiment is not limited thereto. Namely, even when the focus ring 114 is an object to be operated and the focus lens 110 is an object to be driven, the idea of the first embodiment can be applied. In short, the idea of the first embodiment can be applied to control performed when an object to be driven which may become a noise generating source during audio recording is driven using an operating member.

Figure 8:
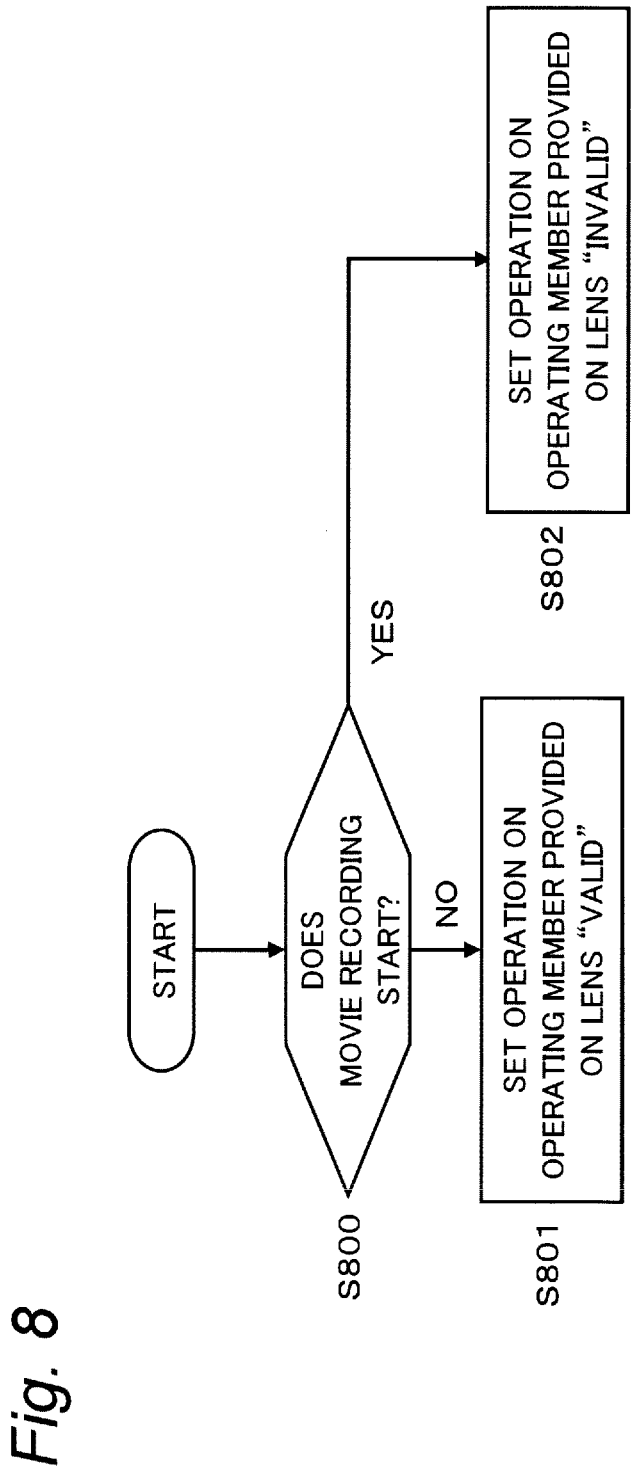
FIG. 8 is a flowchart showing a process of setting the operations of operating members on the lens side to valid/invalid.

In addition, there may be a case in which unexpected noise may occur in the camera body 102 when an operating member provided on the interchangeable lens 101 is operated. To avoid such noise generation, control as shown in FIG. 8 may be performed. FIG. 8 is a flowchart of a process of setting the operation of the operating members on the lens to valid/invalid. The camera controller 153 monitors whether moving image recording has started by operating the movie record button 161 in the state in which an image can be captured (S800). If the moving image recording has not started (NO in S800), then the camera controller 153 sets operations of the operating members on the lens to valid (S801). By this, since the operation on the lens is treated as valid, when any operating member on the lens is operated, the corresponding driving object is driven according to the operation. At this time, the fact that moving image recording has not started may or may not be notified to the lens controller 120. On the other hand, if the moving image recording has started (YES in S800), then the camera controller 153 notifies the lens controller 120 that the moving image recording has started, and the lens controller 120 sets the operation of the operating members on the interchangeable lens 101 to invalid (S802). By this, since the operation on the lens is treated as invalid, even if an operating member is operated on the interchangeable lens 101, the corresponding driving object is not driven and thus unexpected noise generated on the camera body 102 can be avoided.

Although the configurations in the above-described embodiments are configured for a purposes to prevent recording of noise generated by the drive of a driving object, the idea of the above embodiment can also be applied to solve other purpose. For example, the idea of the embodiment can be applied to prevent degradation in the image quality of still images. Specifically, if the zoom lens 112 is driven by the zoom lens driver 113 during image processing of a still image, then fluctuation of the power supply occurs due to an increase in power consumption caused by the drive of the lens. The power supply fluctuation may cause noise, affecting image quality. To solve this problem, it can be considered to perform control not to drive the zoom lens 112 during a period from when exposure by the CMOS image sensor 150 starts until image processing ends. Hence, in still image recording, when the zoom lens 112 is operated during a period from when exposure by the CMOS image sensor 150 starts until image processing ends and the camera controller 153 obtains, from the interchangeable lens 101, information about an actuator, information about a drive pattern, and drive speed information according to the operation, the camera controller 153 may send the lens drive permission notice to the lens controller 120 when the image processing ends. At this time, the lens controller 120 starts drive of the zoom lens 112 after receiving the lens drive permission notice. This control can prevent degradation in image quality due to the power supply fluctuation which is caused by the zoom lens 112 being driven during image processing of a still image.

INDUSTRIAL APPLICABILITY

The embodiment can be applied to an interchangeable lens type imaging apparatus to which an interchangeable lens having members to be driven is mountable, such as a digital camera and a movie camera.

What is claimed is:

1. A camera body to which an interchangeable lens is mountable, the interchangeable lens having a driving object to be driven and an operating member that receives an operation performed by a user to provide an instruction for driving the driving object, the camera body comprising:
   an imaging unit operable to capture a subject image formed through the interchangeable lens to generate image information;
   an audio obtaining unit operable to obtain audio information approximately at the same time as when the imaging unit generates the image information;
   a recording unit operable to record the image information and the audio information in a recording medium; and
   a camera controller operable to control the audio information to be recorded in the recording medium, wherein the camera controller obtains, from the interchangeable lens, drive information of the driving object corresponding to the operation performed on the operating member, thereafter controls, based on the obtained drive information, the audio information to be recorded in the recording medium, and thereafter notifies the interchangeable lens of information indicating permission to start driving the driving object;

the camera controller performs a noise canceling process by controlling, based on the drive information, the audio information recorded in the recording medium to cancel out noise which may be generated when the drive object is driven; and the camera controller starts the noise canceling process to cancel out the noise before notifying the interchangeable lens of the information indicating the permission to start driving the driving object and before the driving object starts to be driven.

2. A camera system comprising an interchangeable lens and a camera body to which the interchangeable lens is mountable, the interchangeable lens comprising:
   a driving object operable to be driven;
   an operating unit configured to receive an operation performed by a user to provide an instruction for driving the driving object;
   a driver operable to drive the driving object; and
   a lens controller operable to control the driver, the camera body comprising:
   an imaging unit operable to capture a subject image formed through the interchangeable lens to generate image information;
   an audio obtaining unit operable to obtain audio information approximately at the same time as when the imaging unit generates the image information;
   a recording unit operable to record the image information and the audio information in a recording medium; and
   a camera controller operable to control the audio information to be recorded in the recording medium, wherein
   the lens controller notifies the camera body of drive information of the driving object corresponding to the operation received by the operating unit,
   the camera controller controls the audio information to be recorded in the recording medium based on the drive information when obtaining the information about drive from the interchangeable lens, and thereafter notifies the interchangeable lens of information indicating permission to start driving the driving object,
   the camera controller performs a noise canceling process by controlling, based on the drive information, the audio information recorded in the recording medium to cancel out noise which may be generated when the drive object is driven, and
   the camera controller starts the noise canceling process to cancel out the noise before notifying the interchangeable lens of the information indicating the permission to start driving the driving object and before the driving object starts to be driven, and
   the lens controller controls the driver to start driving the driving object when obtaining the information indicating permission to start driving the driving object from the camera body.

3. The camera system according to claim 2, wherein the driving object is one of a zoom lens, a focus lens, or a diaphragm.

4. The camera body according to claim 1, wherein the drive information is lens-specific sound data corresponding to drive patterns of the driving object.

5. The camera system according to claim 2, wherein the drive information is lens-specific sound data corresponding to drive patterns of the driving object.

* * * * *